US006676872B2

(12) United States Patent
Story et al.

(10) Patent No.: US 6,676,872 B2
(45) Date of Patent: Jan. 13, 2004

(54) DIE AND PROCESS ESPECIALLY FOR STAMPING DETERGENT BARS

(75) Inventors: Edward Ross Story, Timonum, MD (US); Daniel John Heinz, Joppa, MD (US); Pasquale Michael Buzzeo, Westminster, MD (US)

(73) Assignee: Lever Brothers Company, division of Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 09/000,558

(22) Filed: Dec. 30, 1997

(65) Prior Publication Data

US 2003/0057596 A1 Mar. 27, 2003

(51) Int. Cl.[7] .......................... B29C 33/40; B29C 33/56

(52) U.S. Cl. .................... 264/219; 264/338; 249/114.1; 249/115; 249/135; 425/394; 425/395; 425/398; 425/403; 425/470; 427/133; 427/135

(58) Field of Search ................................ 427/133, 135; 264/219, 338; 249/114.1, 115, 135; 425/395, 394, 398, 403, 470

(56) References Cited

U.S. PATENT DOCUMENTS

| | | | | |
|---|---|---|---|---|
| 2,965,946 A | * | 12/1960 | Sweet et al. | 264/325 |
| 3,041,989 A | | 7/1962 | Tanner et al. | |
| 3,534,440 A | | 10/1970 | Roberts | |
| 3,761,047 A | | 9/1973 | Mao | |
| 4,629,650 A | | 12/1986 | Katooka | |
| 4,758,370 A | * | 7/1988 | Jungermann et al. | 252/132 |
| 4,793,959 A | | 12/1988 | Adams et al. | |
| 4,822,273 A | | 4/1989 | Adams et al. | |
| 4,940,561 A | | 7/1990 | Fritz | |
| 5,013,346 A | * | 5/1991 | Matsumoto et al. | 65/21.2 |
| 5,035,849 A | | 7/1991 | Uemura et al. | |
| 5,176,188 A | | 1/1993 | Quinn et al. | |
| 5,236,654 A | | 8/1993 | Adams et al. | |
| 5,269,997 A | | 12/1993 | Leslie | |
| 5,332,190 A | | 7/1994 | Watanabe | |
| 5,378,733 A | | 1/1995 | Bates et al. | |
| 5,535,980 A | | 7/1996 | Baumgartner et al. | |

FOREIGN PATENT DOCUMENTS

| | | |
|---|---|---|
| EP | 170 374 | 2/1986 |
| EP | 276 971 | 8/1988 |
| EP | 493 197 | 4/1996 |
| EP | 742 094 | 11/1996 |
| FR | 2710001 | 9/1993 |
| SU | 1291600 | 2/1987 |
| WO | 96/00278 | 1/1996 |
| WO | 98/29235 | 7/1998 |

OTHER PUBLICATIONS

International Search Report mailed Apr. 6, 1999.
"Innovations in Rubber Technology", Ragovin et al., 1967, pp. 113–122.
"Electrical Properties of Paintwork Materials and Coatings", Kaverinskii et al., 1990, p. 59.

* cited by examiner

*Primary Examiner*—Suzanne E. McDowell
(74) *Attorney, Agent, or Firm*—Gerard J. McGowan, Jr.

(57) ABSTRACT

A device for stamping a detergent bar, i.e. a bar comprising soap, a synthetic detergent active or a mixture thereof, includes a die. The die has at least one bar stamping surface provided with at least one elastomeric coating which includes a conductive filler such as stainless steel powder. Good release of the detergent bars from the die is possible particularly when the dies are chilled. Use of the conductive filler facilitates chilling of the dies.

15 Claims, 3 Drawing Sheets

DIE AND PROCESS ESPECIALLY FOR STAMPING DETERGENT BARS

FIELD OF THE INVENTION

The present invention relates to a device, process and apparatus for stamping a plastic material using a die to form a shaped article. In particular, it relates to process for stamping a detergent bar.

By "detergent bar" is meant a tablet, cake or bar in which the level of surface active agent, which comprises soap, synthetic detergent active or a mixture thereof, is at least 20 wt. % based on the bar.

BACKGROUND OF THE INVENTION

In the manufacture of detergent bars, a preformed composition comprising all components of the bar is typically extruded from a nozzle to form a continuous "rod" which is cut into smaller pieces of predetermined length, commonly referred to as "billets." These "billets" are then fed to a stamper or, alternatively, are given an imprint on one or more surfaces using, for example, a die of the same dimensions as the bar surface. The bar surface is hit with force by, eg., a mallet or a die in the shape of a roller, Stampers typically have a die formed in two halves each with a surface which contacts the billet during the stamping operation. These surfaces are adapted to close to a preset separation distance, thereby compressing the billet between the die halves to give the bar its final shape and appearance, and then separate. Excess composition is squeezed out from the die halves as they close. This is commonly referred to as "flash." The flash is then separated from the soap bar by transferring the bar through holes in a "deflashing plate."

Conventional die stamping machines include "pin die" shaped machines in which a pair of opposing die members or die halves meet during a compaction step and a "box die" machine in which a pair of opposing die members stamp a bar held within a through-opening in a box frame but do not meet during compaction, the peripheral face of the bar being restrained by the box frame.

The die halves are often each provided with a die or ejector insert. These are normally held closed within the die halve by springs but can be pushed open by compressed air or mechanical means to assist in the release of the bar from the die. During closing of the die halves a vacuum can be applied to remove air trapped in the die cavity between the detergent bar and die surface and, in the case of rotary dies, this vacuum assists in retaining the bars in place during rotation.

Stamping of detergent bars using a die is carried out to give the bars a reproducible shape, smooth surface and/or to imprint a design such as a logo, trademark or the like onto at least part of a surface of the bar.

However, as a result of die-blocking, i.e. amounts of residual detergent left on die halves which builds up during continued use of the dies, bars are often formed with visible imperfections on their surfaces or they may not release from the die surface. Incomplete release of detergent bars is a particular problem for more "sticky" compositions made of milder surfactants.

Numerous solutions to these problems have been proposed. One solution involves chilling the die halves during the stamping operation. Others have involved use of elastomers, Watanabe, U.S. Pat. No. 5,332,190 discloses an elastic molding die composed of an elastomer laminate film, the innermost layer of which does not contain fillers.

In U.S. Pat. No. 5,269,997 it is proposed to provide each of two dies of a soap mold with an elastomeric septum stretched across their surfaces. Such a system would be complex to use at the speed required for commercial manufacture and a thin covering would be prone to tearing and logo reproduction would be expected to be poor.

WO 96/00278 discloses a device for stamping a detergent bar comprising a die, the die having at least one bar stamping surface wherein the bar stamping surface is provided with an elastomeric coating, the total thickness of the elastomeric coating being less than 200 microns. In a preferred embodiment, the elastomeric coating is the sole elastomeric material of the bar stamping surface.

Another solution is proposed in EP 276 971 and U.S. Pat. Nos. 4,793,959 and 4,822,273, which involve the use of two die members, each comprising a non-elastomeric and an elastomeric part. The elastomeric part, which contacts the soap bar during the stamping process, comprises an elastomer coating of at least 200 microns and having a modulus of elasticity within a specified range.

Adams et al., U.S. Pat. No. 4,822,273 is directed to a die for stamping detergent bars which has a facing layer of elastomer. Example 7 mentions surface chilling of metal dies.

Adams et al., U.S. Pat. No. 4,793,959 is directed to detergent bars stamped with a die having a facing layer of elastomer. Chilled dies are mentioned in example 7.

Adams et al., U.S. Pat. No. 5,236,654 is directed to the stamping of detergent bars using liquid cooled coating die members. Die cooling using a coolant at about −20° C. is mentioned. It is stated that the systems previously selected by factory engineers achieved average die surface temperatures of approximately 15° C. with a wide distribution of temperatures across the die surface.

Kataoka, U.S. Pat. No. 4,629,650 is directed to a process for producing a molded thermoplastic resin by interposing during molding a thermoplastic resin different from the thermoplastic resin to be molded as a skin layer between the die surface and the thermoplastic resin to be molded.

Uemura et al., U.S. Pat. No. 5,035,849 is directed to a process for producing a molded article. The surface of the mold is cooled with a releasing agent for powder molding.

Leslie, U.S. Pat. No. 5,269,997 is directed to a method and apparatus for stamping a blank of plastic material such as a soap blank. An elastomer septum may be placed across each die half between the blank and the die half so as to prevent plastic material from sticking to the die halves after stamping.

Mao, U.S. Pat. No. 3,761,047 is directed to a film having heat-insulating particles such as talc. In Example 1, 30% by volume talc having an average size of about 60 microns is dispersed in a polytetrafluorethylene resin solution.

Bates et al., U.S. Pat. No. 5,378,733 is directed to a sound attenuating polymeric composite which comprises polyurethane having a filler comprising powdered stainless steel.

Even where elastomeric coatings or chilled dies are employed, problems are encountered when the detergent used is a very mild surfactant and/or the detergent bar composition is soft and sticky.

SUMMARY OF THE INVENTION

It has been discovered that the problems attendant to stamping of detergent bars comprising very mild surfactants and/or particularly sticky and soft compositions can be alleviated by the use of an elastomer coated die wherein the elastomer includes a conductive filler such as a conductive steel powder. By loading the elastomer with conductive steel powder and adjusting the elastomer formulation, thermally conductive polymers can be achieved. As a result, the normally insulating effect of the coating is reduced and chilling of the dies can be facilitated. Application of an elastomer which contains thermally conductive additives to a soap bar gives the release capability of a conventional insulating elastomer with the surface quality of a chilled surface.

For a more complete understanding of the above and other features and advantages of the invention, reference should be made to the following detailed description of preferred embodiments and the accompanying drawings.

DETAILED DESCRIPTION OF THE INVENTION

Figure 1:
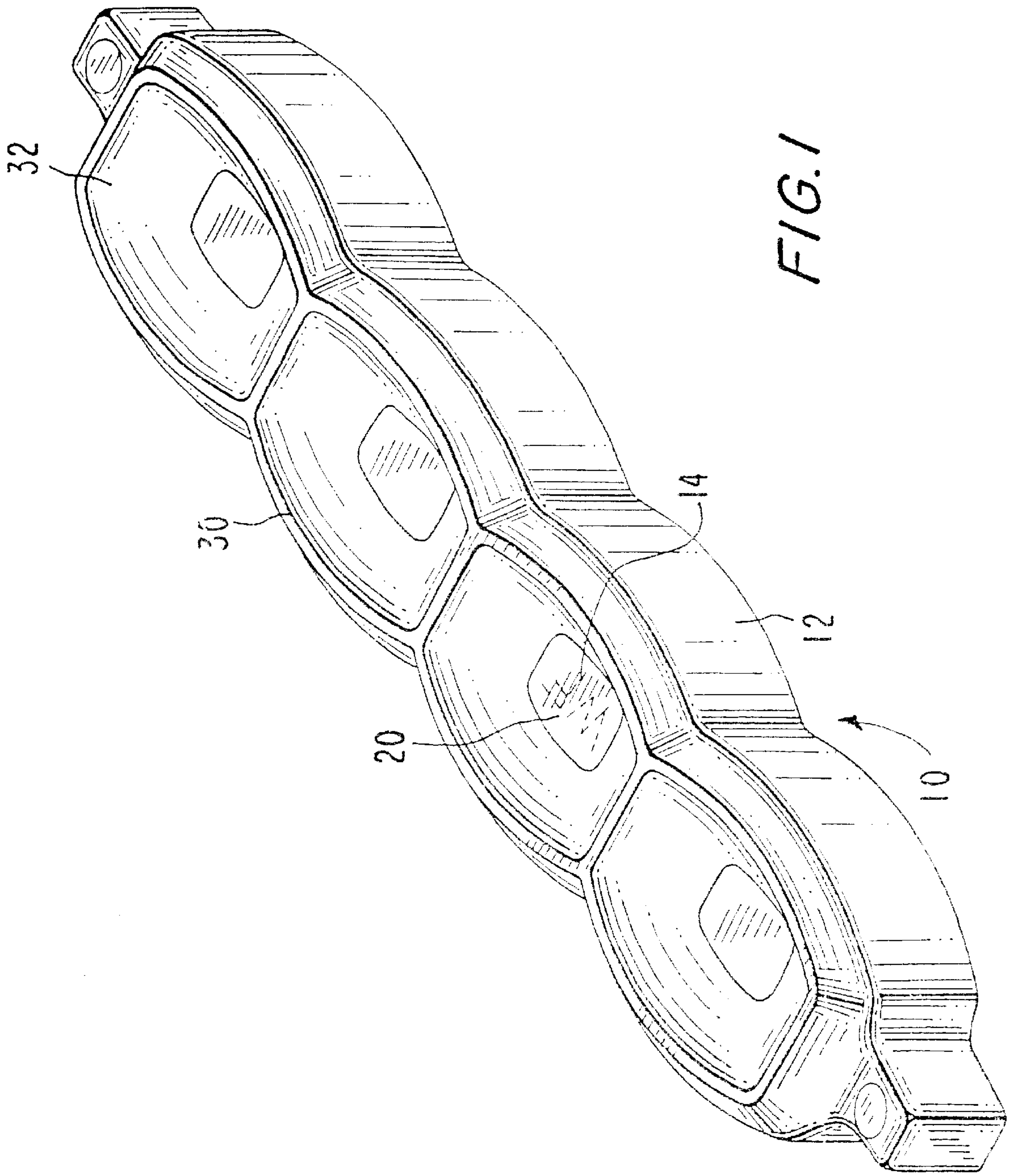
FIG. 1 is a perspective view of dies in accordance with the invention.
Figure 3:
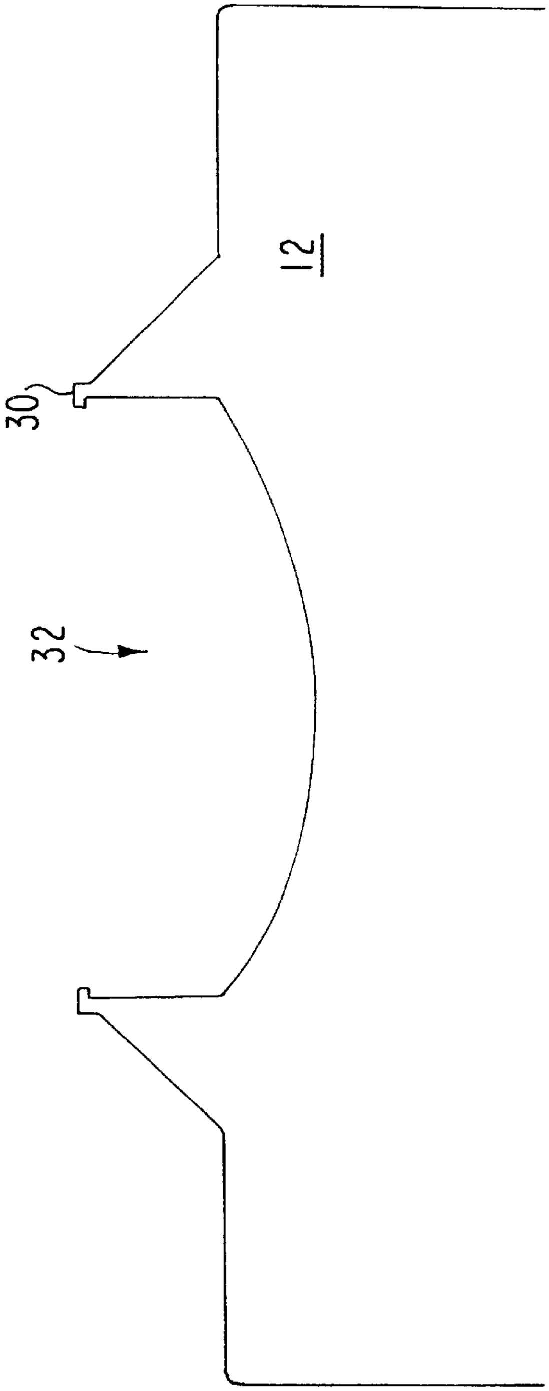
FIG. 3 is a cross-sectional front view of a die prior to application of elastomeric coating.
Figure 2:
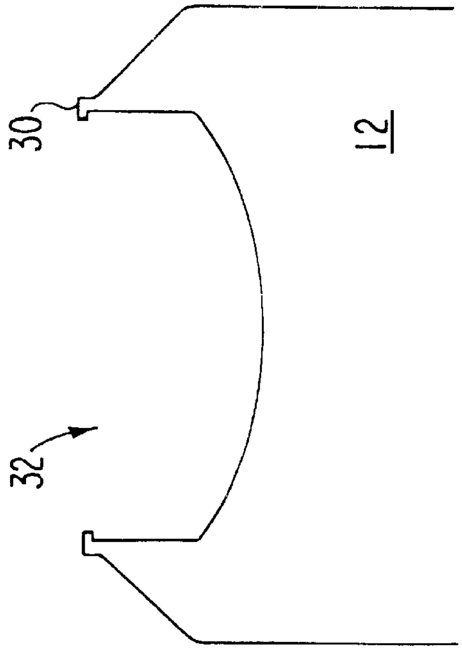
FIG. 2 is a cross-sectional side view of a die prior to application of elastomeric coating.

The use of thick elastomeric coatings in soap bar stamping is described in EP 276971 and U.S. Pat. Nos. 4,793,959 and 4,822,273, the disclosures of which are hereby incorporated by reference.

U.S. Pat. No. 5,378,733 describes filled elastomer materials which are suitable for the present invention. The disclosure of the '733 patent is hereby incorporated by reference.

Hereinafter by "surface decoration" is meant a uniform shape, smooth surface, a design such as a logo, trademark or the like.

By "elastomeric" according to the invention is meant a material as defined in ISO (International Standard Organization) 1382 as an "elastomer," or a "rubber." Also included in the definition of "elastomeric" materials according to the invention are thermoplastic elastomers and copolymers and blends of elastomers, thermoplastic elastomers and rubbers.

Elastomers are defined as polymers with long flexible chains, independent in the raw material and transformed via vulcanizing or crosslinking agents which introduce crosslinks and form a crosslinked network structure. The network structure retains the movement of the macromolecular chain molecules and as a result returns rapidly to approximately its initial dimension and shape after deformation by a force and release of the force.

With increasing temperature an elastomer goes through a rubbery phase after softening and retains its elasticity and elastic modulus until its decomposition temperature is reached.

Thermoplastic elastomers comprise amorphous and crystalline phases. The amorphous phase has a softening range below ambient temperature and thus acts as an elastic spring while the crystalline segments whose softening range is above ambient temperature, act as crosslinking sites.

Preferably the elastomeric material according to the invention is selected from those classes described in American Society for Testing and Materials D1418 which include:

1. Unsaturated carbon chain elastomers (R class) including natural rubbers e.g. Standard Malaysian Rubber; butadiene e.g. "BUNA' type ex Bunaweke Huls; and butadiene acrylonitrile copolymer e.g. "Perbunan" ex Bayer.
2. Saturated carbon chain elastomers (M Class) including ethylene-propylene types e.g. "Nordel" ex DuPont and fluorine-containing types e.g. "Viton" DuPont.
3. Substituted silicone elastomers (Q Class) including liquid silicone rubbers e.g. Silastic 9050/50 P (A+B) ex Dow Corning.
4. Elastomers containing carbon, nitrogen and oxygen in the polymer chain (U Class) including polyurethanes e.g. polyurethanes ex Belzona.

The "elastomeric" material, as hereinbefore defined, may be pretreated, such as by forming a solution of a commercially available elastomer, prior to it being applied as a coating on the die surface. The elastomers, rubbers, and copolymers and blends thereof are generally cured or crosslinked, in-situ on the die surface. For example, the components including the base elastomeric material, crosslinking agents and other materials such as accelerators may be mixed prior to application as a coating. Once applied to the die the coatings are cured in-situ. This may be aided by the application of heat or other accelerating processes, for example pressure; radiation or UV light.

The elastomeric material may be applied as either a liquid or a semi-solid. For instance, when applied as a liquid, the two halves of the die are held apart at a predetermined spacing to permit the elastomer to occupy the space between the two parts. Preferably, the die is filled with elastomer under pressure.

In some cases, materials may be dissolved with an appropriate solvent, applied to the die and the solvent subsequently driven off.

In the case of thermoplastic materials, they can be heated to melt condition applied to the die, cooled and resolidified.

Materials suitable as elastomeric coatings in the present invention will preferably have a modulus of elasticity in the range 0.1 to 50 MPa, most preferably 1 to 35 MPa.

The modulus of elasticity of an elastomeric coating may be measured by recording the force required to indent the coating as a function of the indentation depth. Typically an indentor with a spherical tip may be employed and the slope, s, of the force as a function of the indentation depth to the power 3/2 is determined. The indentation depth is the movement of an indentor into the coating after it first contacts the surface of the coating. In general, it is necessary to correct the measured indentation depth for the compliance of the measurement apparatus, That is, the actual indentation depth, d, is related to the measured apparent value d' by the following expression $$d=d'-(F.C)$$

where F is the indentation force. The compliance C is determined by compressing the indentor against a rigid surface and recording the apparent displacement as a function of the applied force which had a slope equal to C. The modulus of elasticity E is calculated from the following expression $$E=\tfrac{3}{4}s1/(R)^{1/2}(1-b^2)$$

where $s=F/d^{3/2}$, R is the radius of the spherical tip of the indentor and b is the Poisson's ratio of the coating which is equal to about 0.5 for elastomers.

Under certain conditions to be described hereafter, the above indentation method may give falsely large values of the elastic modulus due to the influence of the rigid material onto which the coating is applied. In order safely to avoid this problem it is necessary to ensure that the contact radius of the indentor with the coating does not exceed about 1/10 of the thickness of the coating. The contact radius, a, is related to the indentation depth by the following expression $$a=(dR)^{1/2}$$

For coatings less than 200 um, it is recommended that a nanoindentor is used which is capable of measuring indentation forces at small indentation depths using indentors with tips having a small radius. An example of such equipment is the "NanoIndenter II" (Nano-instruments). The alternative is to make thick (greater than 200 um) test coatings so that more conventional measurement equipment such as an Instron tester, (eg Model 5566) may be employed.

Preferably the die comprises a rigid material selected from metals and their alloys, for example brass and other copper alloys, aluminum, and steels including carbon and stainless steel; and other non-elastomeric materials such as thermosetting and thermoplastic resins, for example polyester, epoxy resins, furan resins; hard cast polyurethanes; ceramics; composites and laminates.

In accordance with the invention, the elastomeric coating incorporates a conductive filler, such as powdered stainless steel. In addition, mixtures containing powdered stainless steel or other conductive fillers may be used. Other fillers which may be employed include copper, titanium, gold, silver, and platinum. Preferably, the conductive filler is a metal.

The fillers added, eg. the stainless steel, increase the bulk hardness of the coating from around 45 Shore A to 70 Shore A. Although this hardness would otherwise reduce the release properties, each particle is surrounded by elastomer hence the soap still contacts a low hardness material. A 1–20 micron thickness coating gives good release in appropriate circumstances. This, although the hardness may be greater than 55 Shore A, even greater than 65 Shore A, release is still good.

The conductive fillers are incorporated into the elastomer preferably at from 0.5 to 85 wt. %, especially 5 to 75%.

The filler of the invention is preferably particulate.

By "conductive" herein it is meant that the fillers are thermally conductive. The major benefits of chilling the elastomer are:

1. Increases in bar surface quality—the harder bulk properties allow good logo definition.
2. Increases in the general bar quality because the soap surface and bulk is cooler hence harder and less likely to be damaged through the rest of the packing line.
3. Reduced adhesion due to the combination effect of the two technologies—elastomer and chilled die surface.

An additional benefit is the fillers decrease the compressibility hence reduce weight variations that can occur when the soap hardness changes with conventional elastomers.

Steel filler has been used to obtain the benefit of increased conductivity. Naturally, any conductive powder can be used such as copper, aluminum. Non-metal fillers would also deliver the benefits although the effectiveness of the chilling would be reduced. By using steel a 3–5 degree lower temperature was obtained than without filler.

It is generally preferred that from about 1 wt. % to about 80 wt. % of the conductive filler be used in the coatings of the present invention, especially from 1% to 20%. The conductive filler may be of any shape as long as the filler is uniformly distributed throughout the elastomer prior to curing. For instance, the fillers may in the form of powders or flakes having a mesh size of from about 30 to 430 mesh, preferably from 300 to 350 mesh.

The conductive fillers may be added to one or to a mix of the ingredients in the elastomer prior to curing. Once all the ingredients are present, the material will be mixed and then cured. The elastomers may be prepared as described in Bates, U.S. Pat. No. 5,378,733.

In addition to mixing with the other ingredients, the filler may be incorporated into the elastomer by adhering to one or more surfaces of elastomer, e.g. by sprinkling the filler onto the surface of the elastomer after mixing but prior to curing.

It is particularly preferred that the coated dies according to the present invention be associated with a cooler. The lowering of the temperature of the dies, which are preferably themselves conductive, will be reflected in a lower temperature for the elastomer due to the presence of the conductive filler particles. This will tend to facilitate separation of the detergent bar material from the dies even where the detergent bar material is made of a soft and/or sticky and/or very mild surfactant.

Cooled dies are well known in the art, Die cooling may be afforded by, for instance, passing a cooled fluid such as a liquid adjacent to the die. For instance, Adams, U.S. Pat. No. 5,236,654 describes a process for stamping soap and/or detergent bars using die members wherein a liquid coolant is circulated through tubes having a diameter within the range of 2 to 20 mm formed within the die members, characterized in that the liquid is circulated under turbulent flow conditions. The Adams arrangement or other die cooling arrangements may be used in the present invention. Preferably the dies are cooled so that the elastomeric coating achieves a surface temperature of within the range of −35° C. to 15° C., especially −10° C. to +10° C., most preferably from −5° C. to +5° C.

Additional materials, for example other fillers, can be added to the elastomeric material to modify its mechanical and processing properties. The effects of filler addition depends on the mechanical and chemical interaction between the elastomeric material and the filler.

Fillers can be used to modify the elastomeric material such that desirable properties, for example tear resistance, are achieved. Suitable such fillers include carbon blacks; silicas; silicates; and organic fillers such as styrene or phenolic resins.

Other optional additives include friction modifiers and antioxidants.

The stress to which the elastomeric coatings are subjected during stamping can be reduced by use of an edge of flange, especially one which is itself similarly coated with elastomer. Preferably the edge or flange is made of a metal or other hard or rigid material. Use of the metal edge results in diminished tearing of the elastomer by lowering the stress to which it is subjected. The edge extends over the leading edge of the elastomer and thereby protects the elastomer from the applied stressed during stamping. This appreciably improves the useful life of the elastomer coated due and permits the advantages of the coated dies to be enjoyed without the disadvantage of an extremely short useful life.

Although it may be easier to make the edge of the same material as the die, this is not a necessity.

The edge or flange may be made of a multitude of materials, including plastics urethane and composites. The edge is provided by a "T" or umbrella shaped structure wherein the elastomer is protected beneath the top of the umbrella.

The edge is particularly useful for dies used to make detergent bars which have sidewalls which extend generally perpendicularly to the longitudinal axis of the bar, that is, "banded bars." Elastomeric dies for banded bars are believed to experience even higher stress than elastomeric dies for bars lacking a vertical sidewall or for which the vertical sidewall extends only a short percentage of the height of the bar.

The edge or flange should extend from the die wall to cover the thickness of the cavity coating and preferably the thickness of the coating outside the cavity. The dimensions of the edge for optimal performance are therefore determined by the desired coating thickness.

The thickness and hardness of the elastomeric coating can be varied according to the detergent bar composition, processing temperature and/or process parameters such as the shape of the cavity in the die halves, speed of the stamping equipment and separation distance of the die halves, in order to achieve the desired result, for example, good release of the detergent bar from the die. For more complex logo bearing die or more complex die shapes, acceptable die release is favored by the use of thicker coatings and a lower modulus. Similarly, for a bar composition which is inherently more difficult to stamp, acceptable die release may be achieved with a thicker elastomeric coating and/or one having a lower modulus of elasticity.

The device according to the invention can be used to stamp a detergent bar comprising a surface active agent which comprises substantially soap or a synthetic detergent or a mixture of soap and synthetic detergent. It finds particular application in the stamping of soft and/or tacky detergent and/or mild bars which contain synthetic surfactants, translucent and transparent soap bars having a reduced fatty matter content, for example, in the range 63–78% wt. with respect to the total bar weight, and those bars containing skin beneficial agents such as humectants, polyols, oils, fatty acids and fatty alcohols.

According to a further aspect of the invention there is provided a process for stamping a detergent bar comprising i) forming an elastomeric coating incorporating a conductive filler on a die;

ii) feeding a detergent bar composition to the die of step i;

iii) stamping the composition in the die to form a stamped bar; and iv) preferably releasing the bar from the die such that a surface decoration is applied to the bar in an easily reproducible manner.

Preferably, the elastomeric coating is bonded to the die stamping surface by mechanical and/or chemical means to increase the adhesion between the die and the coating.

It is particularly preferred that the edge used to relieve the stress on the elastomeric coating is itself also partly coated with the elastomeric coating. Advantageously, the coating on the edge is thinner than that present on the bar stamping surface of the die. For example, it may range from 1 to 200 microns, especially from 10 to 50 microns.

Figure 4:
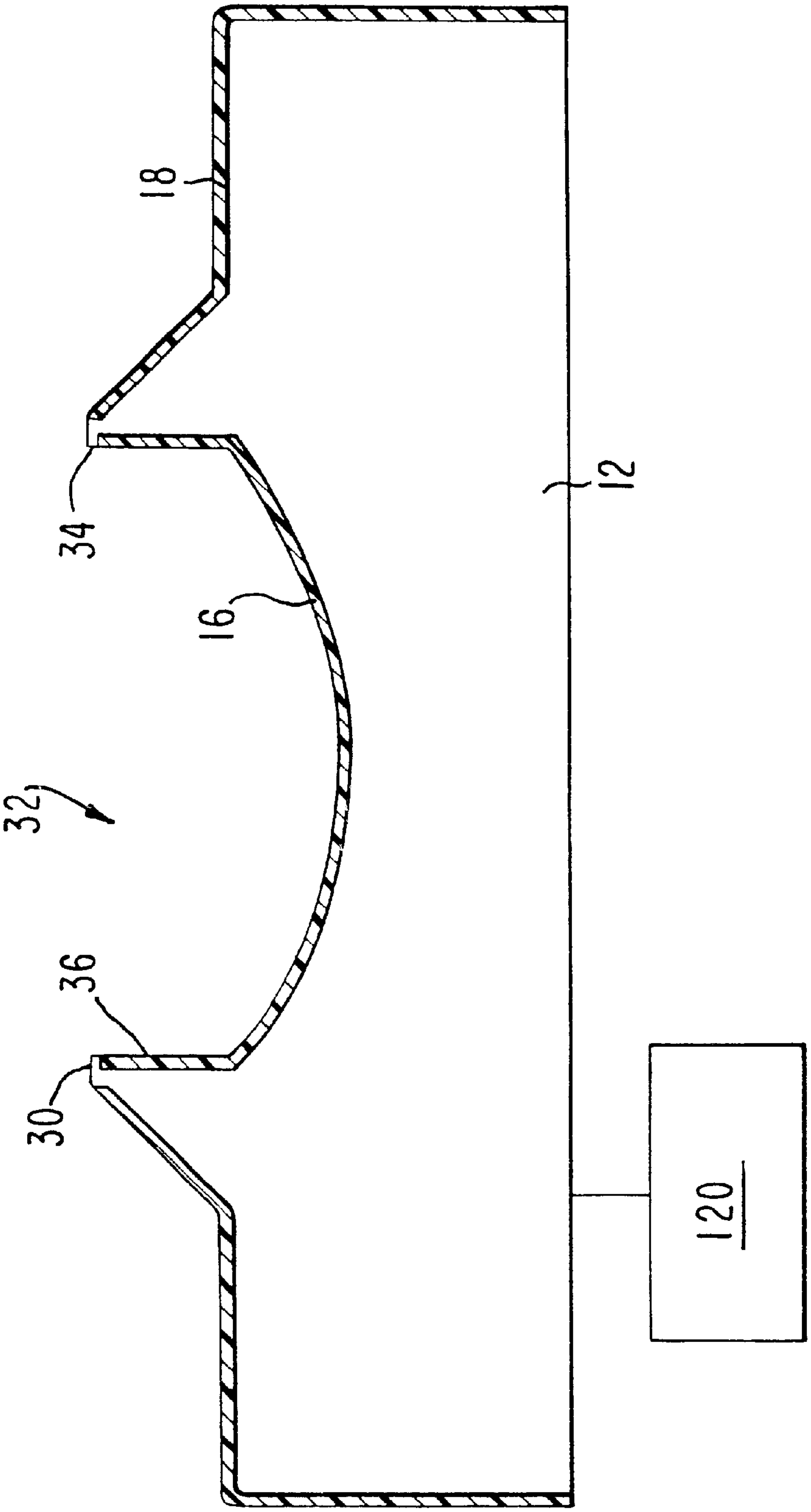
FIG. 4 is a cross-section of the die according to FIG. 3 wherein the die has been coated with the elastomeric coating.

Referring to the figures in detail. FIG. 1 shows die halves 10 comprised of individual dies 12. Each die half is provided, on the bar stamping surface 14, with an elastomeric coating 16 filled with conductive filler (FIG. 4). Elastomeric coating is also provided on the non-stamping surface 18 of the die halves. One die half is provided with a logo 20 on the bar stamping surface. (In some cases both die halves will incorporate a logo). This is also coated with an elastomeric coating.

Die 12 includes metal edge 30 which projects inwardly from the upper periphery of the detergent bar cavity 32. As seen in FIG. 4, edge 30 covers the upper edge of the generally vertically ascending section of the coating 16. Preferably, surface 34 of edge 30 which faces the cavity 32 is at least flush with the surface 36 of elastomer 16 which likewise faces cavity 32. Still more preferred is an arrangement wherein edge 34 of metal edge 30 extends slightly beyond the surface 36 of coating 16. Chiller 120 lowers the temperature of die 12, as by circulating cooling fluid in contact with the die.

Using the edge or flange of the invention, the die is constructed so that the soft elastomer near the cutting edge is not damaged when the die cuts into the soap. This is accomplished by shielding the soft elastomer near the die edge with a rigid and stronger material. The shielding acts like an umbrella around the die edge slightly overlapping the soft elastomer preferably by approximately 0.001" to 0.015". This protects the soft material from excess forces in shear and tension which would accelerate damage to the soft material and render the die inoperative.

While the stress relieving edge of the die has been described as being metal, this will generally depend on the material from which the die is made. Typically, the edge will be same as the material from which the die is made. However the edge will typically be fairly rigid to protect the elastomer.

The invention may be used with conventional stamping equipment, such as Binacchi U.S.N 100.

Preferably the edge is undercut giving a greater mechanical key.

PROPHETIC EXAMPLE

A range of die halves are manufactured in carbon steel and spark eroded to a range of surface roughness values (Ra) degreased with acetone, treated with a primer and then coated with a range of elastomeric materials.

A series of brass die halves are also used in the examples. Similarly, these are degreased with acetone, treated with a primer and then coated.

Elastomeric coatings are formed from polyurethane. The polyurethane is prepared starting with a) Andur 80-5AP—Polyether based liquid isocyanated-terminated prepolymer.
 Supplied by: Anderson Development Co.
 1415 E Michigan Street
 Adrian, Mich. 49221-3499; and
 is cured following addition of 35 wt. % (on total elastomer) of 304L powdered stainless steel having a mesh size of 325 using b) Voronal 234-630 curative—Triol
 Supplied by: Dow Chemical Co
 2040 Dow Center
 Midland, Mich. 48674

The bar compositions used in the examples are as follows:

| | % wt. |
|---|---|
| Formulation A | |
| Anhydrous tallow soap | 52.3 |
| Anhydrous coconut soap | 29.9 |
| Coconut fatty acid | 5.2 |
| Water and minors | to 100 |
| Formulation B | |
| Sodium cocyl isethionate | 27.00 |

-continued

| | % wt. |
|---|---|
| Cocoamidopropyl betaine | 5.00 |
| Polyethylene glycol, M. Wt. | 33.12 |
| Fatty acid | 11.00 |
| Sodium stearate | 5.00 |
| Water + minors | to 100 |
| Formulation C | |
| Sodium cocyl isethionate | 49.78 |
| 82/18 Soap | 8.31 |
| Sodium Stearate | 2.98 |
| Alkyl Benzene sulphonate | 2.02 |
| Stearic acid | 20.15 |
| Coco fatty acid | 3.08 |
| Sodium Isethionate | 4.68 |
| Water + minors | to 100 |

The dies contain metal edges as illustrated at 34 in FIG. 4. The dies are cooled using cooling fluid at a temperature of −20° C. circulated through tubes ranging 2 to 20 mm in diameter.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. A device for stamping a substrate comprising a die, the die having at least one substrate stamping surface receiving an elastomeric coating said coating including conductive filler.

2. A device according to claim 1 wherein the die is made of a metal and is chilled relative to ambient temperature.

3. The device according to claim 1 wherein the substrate is a detergent bar.

4. The device according to claim 3 wherein the elastomeric coating is selected from the group consisting of elastomers; rubbers; and thermoplastic elastomers; and copolymers and blends thereof.

5. The device according to claim 3 wherein the elastomeric coating has a thickness within the range of from 25 microns to 10 millimeters.

6. The device according to claim 5 wherein the thickness of said elastomer coating in said die ranges from 200 to 2,000 microns.

7. The device according to claim 1 wherein the die comprises a rigid material selected from the group consisting of metals and their alloys; thermosetting and thermoplastic resins; hard cast polyurethanes; ceramics; composites and laminates.

8. The device according to claim 1 further comprising a chiller associated with said die.

9. The device according to claim 1 wherein said elastomeric coating is soft.

10. The device according to claim 1 wherein the elastomeric coating has a modulus of elasticity within the range of 0.1 to 50 MPa.

11. The device according to claim 1 wherein said conductive filler is a metal.

12. The device according to claim 1 wherein the conductive filler is stainless steel powder.

13. The device of claim 1 wherein said elastomeric coating is made of polyurethane.

14. The device according to claim 1 wherein the die is selected from the following metals and their alloys: brass, other copper alloys, aluminum.

15. A process for stamping a detergent bar comprising i) forming an elastomeric coating including a conductive filler on at least one bar stamping surface of a die;

ii) feeding a detergent bar composition to the die of step i;

iii) stamping the composition in the die to form a stamped bar; and iv) releasing the bar from the die such that a surface decoration can be applied to the bar in an easily reproducible manner.

* * * * *